Figure 1:
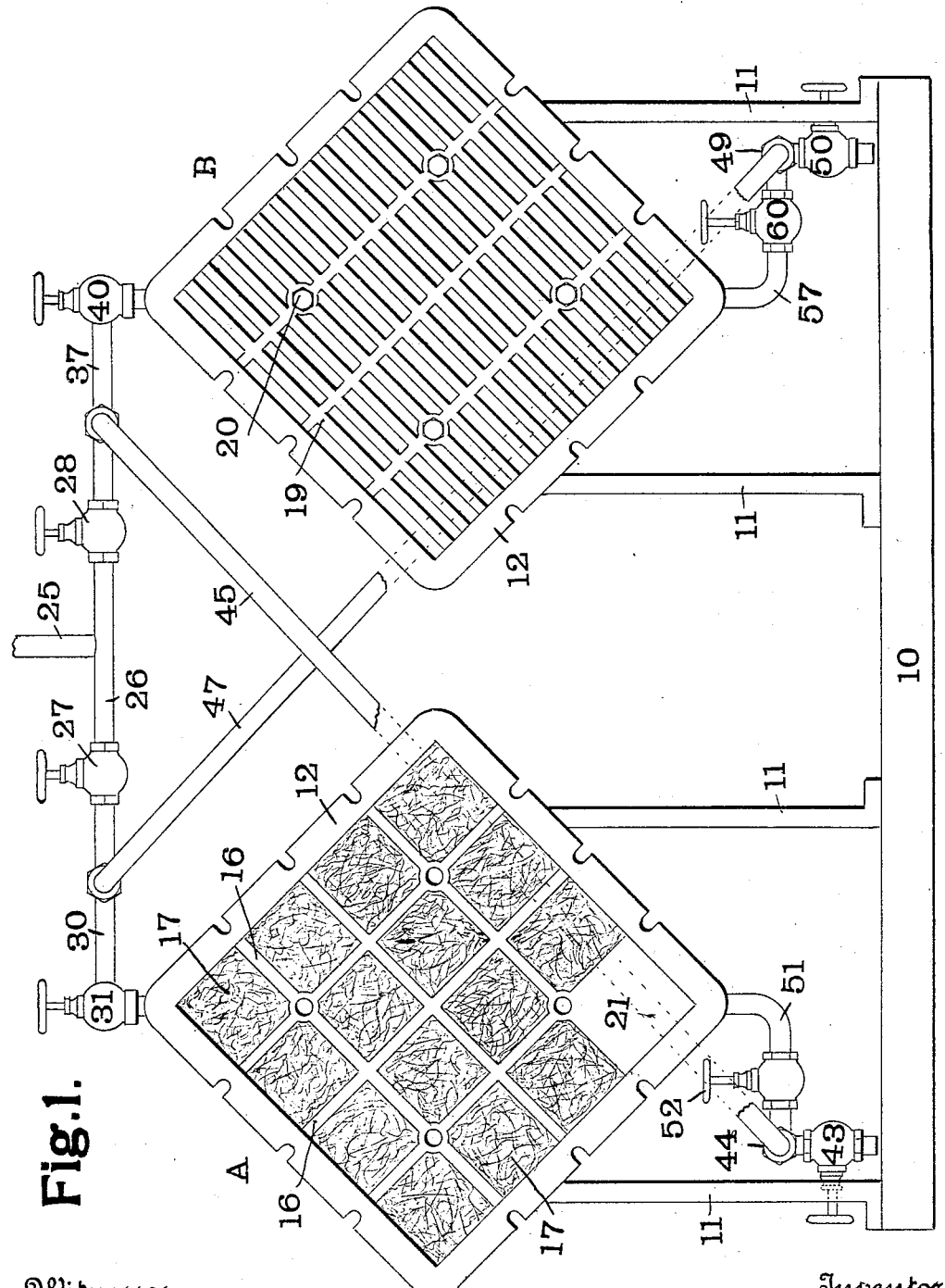

No. 711,046. Patented Oct. 14, 1902.
G. F. GODDARD.
FILTER.
(Application filed Nov. 20, 1901.)
(No Model.) 2 Sheets—Sheet 1.

Witnesses
W. A. Alexander
J. R. Watkins

Inventor
G. F. Goddard
By Attorneys Fowler & Bryson

No. 711,046. Patented Oct. 14, 1902.
G. F. GODDARD.
FILTER.
(Application filed Nov. 20, 1901.)
(No Model.) 2 Sheets—Sheet 2.
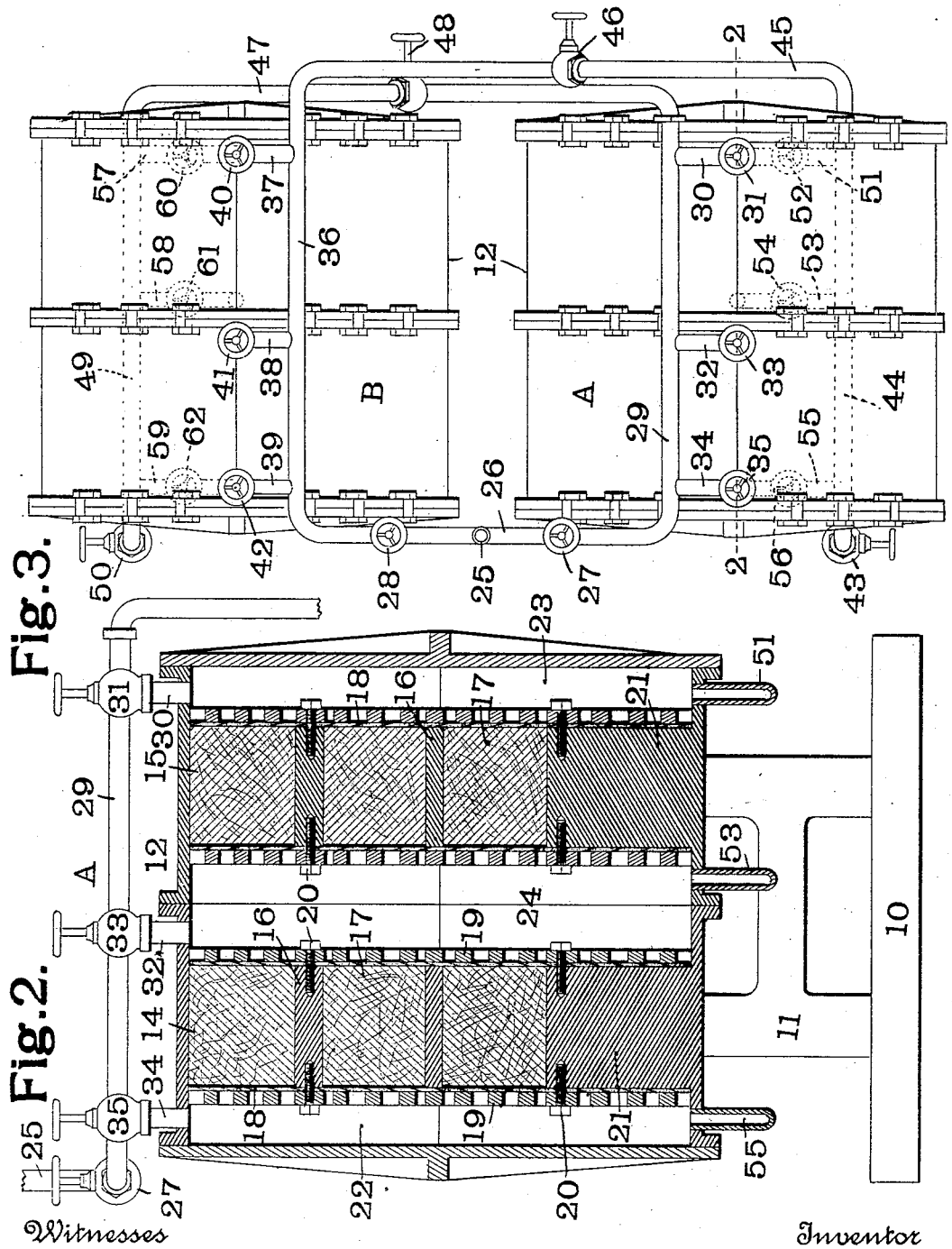
Witnesses
W. A. Alexander
J. R. Watkins
Inventor
G. F. Goddard
By Attorneys

UNITED STATES PATENT OFFICE.

GEORGE F. GODDARD, OF ST. LOUIS, MISSOURI.

FILTER.

SPECIFICATION forming part of Letters Patent No. 711,046, dated October 14, 1902.

Application filed November 20, 1901. Serial No. 82,970. (No model.)

*To all whom it may concern:*

Be it known that I, GEORGE FRANCIS GODDARD, a citizen of the United States, residing at the city of St. Louis, in the State of Missouri, have invented a certain new and useful Filter, of which the following is such a full, clear, and exact description as will enable any one skilled in the art to which it appertains to make and use the same, reference being had to the accompanying drawings, forming part of this specification.

My invention relates to an improvement in filters such as are commonly used in filtering water for household purposes, and has for its object the construction of a filter which will be simple in operation, will thoroughly and cheaply filter the water, and which may be easily and quickly cleaned.

In the drawings hereto attached, in which like characters of reference refer to similar parts in the different views, Figure 1 is an end view of two of my filters, exactly alike in construction, connected together in the way in which I prefer to use them, the front of the casing of each filter being represented as removed and the outer grating and retaining fabric of the filter-bed in the filter at the left hand of the drawing being also represented as removed. Fig. 2 is a vertical section on the line 2 2 of Fig. 3, and Fig. 3 is a top plan view of two of my filters connected together in the way shown in Fig. 1.

A base 10 is provided with supports 11, which carry upon them the filter-casings 12 of the two filters A and B, which casings are rectangular in cross-section. One of the corners of each of these casings projects downward between the supports 11. Each of these filter-casings 12 is provided with two filter-beds, as best shown in Fig. 2, in connection with the filter A, where are the beds numbered 14 and 15, respectively. These filter-beds are divided by the partitions 16, cast integral with the casing 12, as shown in Figs. 1 and 2, into a plurality of chambers 17, which I prefer to fill with a spun fibrous material, such as a high grade of cotton-waste. This cotton-waste is retained in position at each side in the chambers 17 by a sheet of canvas or other similar material 18. Each of these canvases is backed up by a grating 19, having in it narrow rectangular slits, the outer edges of which grating touch the inside of the casing 12. The gratings 19 are kept in position by means of the screws 20. At the lower corner of each of the filter-beds 14 and 15 is a solid portion, as shown at 21. This portion 21 is, like the partitions 16, also cast integral with the casing 12. Between each of the filter-beds 14 and 15 and the ends of the casings 12 are open spaces 22 and 23, and separating the two filter-beds 14 and 15 is the open space 24. 25 is the main inlet-pipe leading into the pipe 26. Situated in the pipe 26 on each side of the inlet-pipe 25 are the valves 27 and 28. The pipe 26 is bent at one end to form an extension 29, passing over the top of the filter A. From the pipe 29 extends the inlet-pipe 30, in which is situated a valve 31, which pipe 30 enters the space 23 in the filter-casing A. Similar pipes 32 and 34, in which are situated valves 33 and 35, enter, respectively, the open spaces 24 and 22 in the filter-casing A. From the pipe 36 lead inlet-pipes 37 38 39 into the open spaces 23, 24, and 22, respectively, of the filter-casing B. In the pipe 37 is situated the valve 40, in the pipe 38 the valve 41, in the pipe 39 the valve 42. Below the filter-casing A and at one end thereof is the main outlet-valve 43, which closes the outlet-pipe 44, which passes transversely beneath the filter A and to the opposite end of which pipe 44 is connected the pipe 45, which passes diagonally across one end of the two filters from the pipe 36 upon the top of the filter-casing B to the outlet-pipe 44 beneath the filter-casing A. In this pipe 45 is situated the valve 46. A similar pipe 47 passes across the same end of the two filters from the pipe 29 to the outlet-pipe 49 beneath the filter B. In this pipe 47 is situated the valve 48. At the other end of this outlet-pipe 49 is a second main outlet-valve 50.

Referring now to the filter A, as shown in cross-section in Fig. 2 and in plan in Fig. 3, an outlet-pipe 51 leads from the bottom of the open space 23, and hence to the outlet-pipe 44. In this pipe 51 is situated the valve 52. A similar outlet-pipe 53 leads from the open space 24 into the outlet-pipe 44 and has in it a valve 54, and a third outlet-pipe 55 leads similarly from the open space 22 into the outlet-pipe 44 and has situated in it a valve 56. As the two filters A and B are exactly alike in construction, it will be understood that the outlet-pipe 49 is similarly connected by the outlet-pipes 57, 58, and 59 with the open spaces 23, 24, and 22 of the filter B. In these outlet-pipes 57, 58, and 59 are situated valves 60, 61, and 62, respectively.

In the operation of my filters when connected in pairs, as shown here, the water may be passed through the various filter-beds in different orders and either through one or more of them, as may be desired. Take, for example, the filter A. By opening the valve 27 and the valve 33 and keeping closed the valves 31 and 35 the water will enter the middle space 24, and if the outlet-valve 54 at the bottom of that space is closed and the outlet-valves 52 and 56 at the bottoms of the open spaces 23 and 22, respectively, are opened the water will pass through the filter-beds 14 and 15 and enter the spaces 23 and 22 and pass thence through the outlet-pipes 51 and 55 and into the main outlet-pipe 44, and thence in the outlet-valve 43. In case it is desired to filter the water twice in the same filter it may be done as follows: The valve 27 in the pipe 26 and the valve 31 in the inlet-pipe 30 and the valve 56 in the outlet-pipe 55 are opened and all the other valves are closed, except the main outlet-valve 43. The water then passes into the open space 23 through the filter-bed 15, into the open space 24 through the filter-bed 14, into the open space 22, thence out through the outlet-pipe 55, into the main outlet-valve 43. In these filtering operations mud will accumulate at the bottom of one or more of the open spaces 22, 23, and 24 in the pockets formed between the solid portions 21 or between each of said portions and the ends of the casing 12. Before or after proceeding to clean the filter-beds it will be found desirable to remove this mud accumulated at the bottom of these open spaces. Thus if we wish to clean out the mud from the bottom of the open space 24 the inlet-valve 33 at the top of this open space 24 is opened, and the outlet-valve 54 at the bottom of this open space 24 is also opened. The water then passes straight through the open space 24, carrying out from its lower part all the accumulated sediment. The open spaces 22 and 23 may likewise be flushed in a similar manner. In cleaning the filter-beds themselves the ordinary process of simply reversing the direction of the flow of water through these beds may be employed and the filter will rapidly clean itself. It will often be found desirable to clean the filter with filtered water, and for this purpose I have shown the two filters so connected together by the pipes 45 and 47 that the filtered water from the outlet-valve of one of the filters may be passed into the inlet valve or valves of the other filter. Thus if it is desired to clean the filter B the filter A is put in operation by properly opening the intake and outlet valves, as described above. The main outlet-valve 43 is then closed and the valve 46 in the pipe 45 is opened. Thus the water is carried upward from the outlet-valves of the filter A to the intake-pipes 37, 38, and 39 of the filter B, whence by a proper arrangement of the valves of the filter B it passes through the filter-beds therein in such a direction as to clean the same thoroughly, and thence out through the main outlet-valve 50. It will be seen that the way in which the water passes through my filters may be greatly varied and that the water may be filtered any number of times, from one to four, in the apparatus described above. The filter-beds 14 and 15 are easy of access, and the cotton-waste with which they are filled is inexpensive and cleanly, thoroughly filtering the water, and being easily and cheaply renewed.

It has heretofore been noticed that in filtering water under high pressure the capacity of any given filter is seriously impaired by reason of the packing of the filtering material, due to the pressure of the water upon it. This packing of the filtering material obstructs the passage of the water therethrough and seriously impairs the capacity of the filter. I have found in using my filter that this disadvantage can be largely obviated by passing water through the filter-bed 14 and through the filter-bed 15 successively. Where it is desired to filter water under high pressure, as described above, I prefer to make the filter-bed 14 of small depth or thickness—say five or six inches. When the water is passed first through the filter-bed 14, the packing that occurs in this bed, due to the pressure of the water upon it, has very little effect upon the capacity of the filter, owing to the fact that the filter-bed 14 is of small depth, and therefore offers but little obstruction, even when tightly packed, to the passage of water therethrough. The passage of the water through the filter-bed 14 greatly reduces its pressure upon the filter-bed 15, so that but little or no packing occurs in this second filter-bed, the water passing therethrough quickly and easily.

It will thus be seen that the capacity of my filter is not materially reduced when filtering water under high pressure if said water is passed successively through the filter-beds 14 and 15.

Having fully described my invention, what I claim as new, and desire to secure by Letters Patent of the United States, is—

1. In a filter, the combination with a casing, of a plurality of filter-beds dividing said casing into open spaces, a plurality of chambers formed in each of said filter-beds, subdivided filtering material in said chambers, means for retaining said filtering material in said chambers, and valved inlet and outlet passages for each of said open spaces.

2. In a filter, the combination with a casing, of a plurality of filter-beds dividing said casing into open spaces, a plurality of chambers formed in each of said filter-beds, subdivided filtering material in said chambers, a foraminous cover for each side of said filter-beds for holding said filtering material in position, gratings holding said foraminous covers, and valved inlet and outlet passages for each of said open spaces.

3. In a filter, the combination with a casing, of a plurality of vertical filter-beds dividing said casing into open spaces, chambers formed in said filter-beds, filtering material held in said chambers, imperforate portions in the lower part of each of said filter-beds forming pockets in said open spaces, valved inlets for said open spaces, and valved outlets for said open spaces leading from said pockets.

4. In a filter, the combination with two casings, of a plurality of filter-beds in each casing dividing it into open spaces, a valved inlet for each open space, a valved outlet for each open space, and conduits connecting the outlets of each casing with the inlets of the other casing.

In testimony whereof I have hereunto set my hand and affixed my seal in the presence of the two subscribing witnesses.

GEORGE F. GODDARD. [L. S.]

Witnesses:
JAMES H. BRYSON,
J. R. WATKINS.